(Model.)
W. COOK.
SCALE MEASURE.
No. 405,464. Patented June 18, 1889.
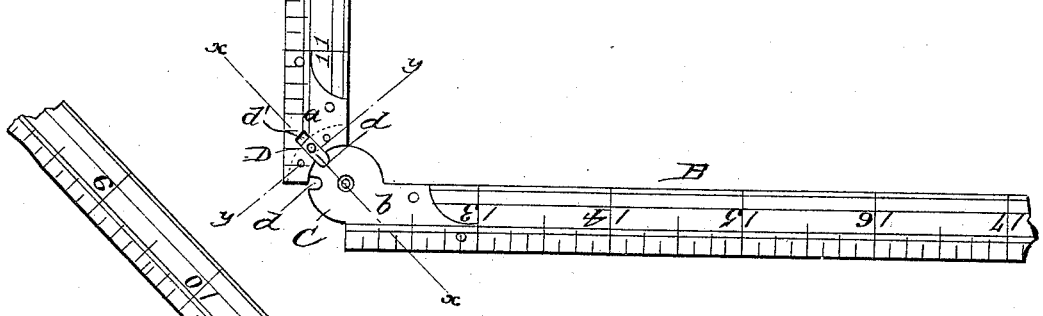
Fig. 1.
Fig. 2.
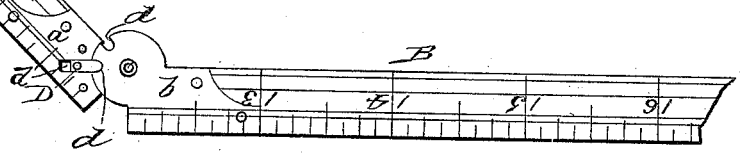
Fig. 3.
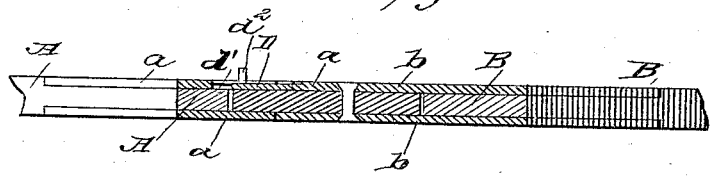
Fig. 4.
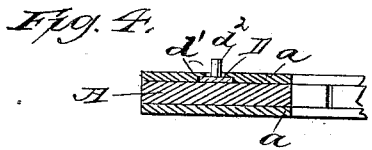
Fig. 5.
WITNESSES: 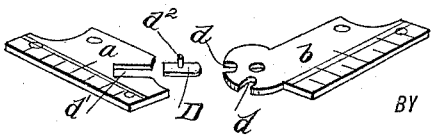 INVENTOR
W. R. Davis. W. Cook
C. Sedgwick BY Munn & Co.
ATTORNEY
N. PETERS, Photo-Lithographer, Washington, D. C.

UNITED STATES PATENT OFFICE.

WILLIAM COOK, OF NEW YORK, N. Y.

SCALE-MEASURE.

SPECIFICATION forming part of Letters Patent No. 405,464, dated June 18, 1889.

Application filed May 4, 1888. Serial No. 272,772. (Model.)

*To all whom it may concern:*

Be it known that I, WILLIAM COOK, of the city, county, and State of New York, have invented a new and Improved Convertible Rule, of which the following is a full, clear, and exact description.

The invention relates to that class of rules in which provision is made for adjusting them for use as a square or a bevel; and the object of the invention is to improve the construction of the adjusting devices with a view of simplifying their operation and minimizing the cost of production.

The invention consists in a certain construction and combination of parts, as hereinafter described and claimed.

Reference is to be had to the accompanying drawings, forming a part of this specification, in which similar letters of reference indicate corresponding parts in all the figures.

Figure 1 is a broken plan view representing the rule adjusted as a square. Fig. 2 is a like view representing the rule adjusted as a bevel for obtaining a miter-line; and Figs. 3 and 4 are sectional views on the lines $x\ x$ and $y\ y$, respectively. Fig. 5 is a perspective view of the notched or slotted face-pieces of the rule and the locking slide separated.

The two graduated arms or members A B of the rule are connected by the ordinary form of joint C. The novel feature consists in constructing one of the brasses or brass face-pieces $b$, which are applied at the said joint, with two notches or slots $d$ in its curved convex edge, and the other or opposite face-piece $a$ with one notch or slot $d'$ in its concave edge, and in arranging in the said slot $d'$ a slide D, which may be adjusted or projected so as to enter either of the two notches $d$ in face-piece $b$ for the purpose of locking the arms A B of the rule at an angle of ninety degrees, as shown in Fig. 1, or forty-five degrees, as shown in Fig. 2. When the arms A B are thus locked, the rule may be used as a try-square or a miter-square. The sides of the slot $d'$, in which the slide D is fitted, are undercut, as shown in Fig. 4, in order to hold said slide in place. The latter is provided with a stud $d^2$, which projects from its face, and serves as a thumb-piece for adjusting the slide. Said stud enters a hole $d^3$ in the rule-arm A when the rule is folded.

It will be seen that the slide is held by the face-plate $a$ alone, and is adapted to engage either notch in the other plate $b$. Thus I attain an economy in manufacture of the rule as compared with others of its special class. There is also an advantage in the arrangement of the parts, since they are in view of the user of the rule, thus promoting convenience in manipulating it. Besides this, the rule-joint is not weakened by this manner of applying the slide.

What I claim is—

The combination, with the rule-arms A B, of the joint face-pieces $a\ b$, provided with notches in their contiguous curved edges, as specified, and the slide D, arranged in the notch of face-piece $a$, said notch having undercut sides for the purpose of retaining the slide therein, as shown and described.

WILLIAM COOK.

Witnesses:
   C. SEDGWICK,
   W. S. WALKER.